United States Patent [19]

Breitmar

[11] 4,264,400
[45] Apr. 28, 1981

[54] THERMAL LAMINATING APPARATUS

[75] Inventor: Paul Breitmar, Willich, Fed. Rep. of Germany

[73] Assignee: G. Siempelkamp GmbH & Co., Krefeld, Fed. Rep. of Germany

[21] Appl. No.: 88,597

[22] Filed: Oct. 26, 1979

[30] Foreign Application Priority Data

Oct. 28, 1978 [DE] Fed. Rep. of Germany ....... 2847010

[51] Int. Cl.³ .............................................. B32B 31/20
[52] U.S. Cl. ................................... 156/497; 156/285; 156/538; 156/580
[58] Field of Search ............... 156/212, 285, 312, 382, 156/444, 459, 475, 464, 497, 499, 538, 552, 556, 543, 567, 568, 580, 583.5

[56] References Cited

U.S. PATENT DOCUMENTS

| 3,483,059 | 12/1969 | Dinter | 156/497 |
| 3,762,619 | 10/1973 | Leavitt et al. | 156/497 |
| 4,046,613 | 9/1977 | Kucheck et al. | 156/497 |

Primary Examiner—Caleb Weston
Attorney, Agent, or Firm—Karl F. Ross

[57] ABSTRACT

An apparatus for laminating a foil or like web to a substrate in which the foil is guided to a thermal-bonding head via an inclined surface provided with perforations and forming a wall of a plenum chamber which is evacuated. The thermal bonding head, in turn, is formed with a perforated surface connected to the discharge side of a blower whose intake side is connected to the plenum chamber so that the foil is urged against the substrate on a suitable conveyor by the pressure from the blower.

8 Claims, 4 Drawing Figures

THERMAL LAMINATING APPARATUS

FIELD OF THE INVENTION

The present invention relates to an apparatus for applying a web of thermally bondable material to a substrate and, more particularly, to a device for laminating a foil or other web-like material to a substrate.

BACKGROUND OF THE INVENTION

For many purposes it is desirable to apply a surface layer of a foil or other material in the form of a web to a plate-shaped substrate or board, for protective, decorative or like reasons.

For example, in the production of pressed board, a decorative, color-imparting, design or other esthetically pleasing layer may be applied to the pressed board substrate for use in construction, furniture or the like. A foil of thermally bondable material, which is free from a pattern and may be transparent, can be provided to protect the surface of a pressed-board or plywood or other laminated substrate to protect the surface of the substrate or a decorative coating or foil which has previously been bonded thereto or to make the resulting board impervious to liquids.

Furthermore, a foil of thermally bondable material or other web-like material can also be applied to boards and like substrates for a variety of other reasons, e.g. to create patterned textures or patterns thereon.

In all such cases, apparatus for the application of the foil web for the thermal bonding of the foil web to a substrate may be desired.

It has already been proposed to apply foil webs to such substrates using apparatus in which the substrate is displaced past the laminating head or unit on a belt conveyor, the latter unit being provided with means for drawing the foil web from a supply roll and pressing the web against the substrate carried past the stationary head by the conveyor. The conveyor can be continuously or intermittently (cyclically) driven and either the substrate or the foil can, when thermally fusible materials are not involved, be provided with coatings of an adhesive which is thermally activatable, either for softening of the adhesive so as to effect the bonding or to polymerize or otherwise harden or set the adhesive.

The system is thus capable of a number of modes of thermal lamination, by which term I understand to include all continuous or intermittent processes for applying foils of various kinds to plate-shaped workpieces. However, this description should be understood as being especially applicable to the coating of particle board, fiber board and the like with finishing foils and decorative foils having a finished upper surface which will constitute an outer surface of the board. In this case the particle or chip board, fiber board or the like will constitute the substrate. While the particle or fiber board may be composed of wood particles or fibers or even more generally, of cellulose fiber, sawdust and the like, materials other than wood substrates or nonwood substrates can be used.

The foils with which the present disclosure is concerned are primarily resin-impregnated papers, carrier-free synthetic-resin foils and so-called thin foils of partially impregnated or coated paper. The foils can also be paper webs, generally previously coated with a synthetic-resin film or printed with a decorative pattern.

Coating units of the aforedescribed type are described in *Verbund von Holzwerkstoff und Kuststoff in the Mobelindustrie,* VDE-Verlag GmbH, pp. 93–107. All of the foils there described and all of the substrates mentioned can be used for the purposes of the present system as well.

In this publication, the laminating apparatus comprises a plurality of calendering-roll pairs which perform various functions. For example, one pair of rolls can be used to bond the substrate to the foil, another pair of rolls can be used for embossing and yet a third pair of rolls for smoothing the laminated body. Calender rolls of this type must be synchronized with relatively complex control devices and technology and the problem of synchronization is even more pronounced when the laminating is to be carried intermittently or periodically, i.e. when spaced apart substrates are to be passed through the system and intervals are provided between laminating operations. Furthermore, with such systems serious difficulties have been encountered with respect to the quality of the product when the lamination is to be carried out at relatively high speed. The quality defects are first and foremost manifested in deterioration of the surface quality of the product.

OBJECTS OF THE INVENTION

It is the principal object of the present invention to provide an improved apparatus for the laminating of a web of flexible material to a substrate whereby the disadvantages of the earlier systems are obviated and in which the serious control problems do not arise.

A more specific object of this invention is to provide an apparatus for the thermal lamination or bonding of a foil web to a rigid substrate which enables the lamination to be carried out at relatively high speed without deterioration of the surface quality of the product.

Still another object of this invention is to provide an improved apparatus for the application of a decorative or protective web or foil of synthetic resin material, resin-impregnated paper or nonimpregnated paper, as a finishing layer, to pressed-wood, particle board, fiber board, chip board and like substrates displaceable past a laminating unit on a conveyor at relatively high speeds.

SUMMARY OF THE INVENTION

These objects and other which will become apparent hereinafter are attained, in accordance with the present invention, in an apparatus which comprises the aforementioned conveyor, (endless-belt conveyor) for transporting the substrate past a stationary laminating unit, and a laminating unit which comprises means for drawing the web from a supply roll thereof and guiding applying the web to the substrate as the latter moves past the unit. According to the invention, at the web-inlet or upstream side of this unit, the unit is provided with a perforated guide surface spaced from the substrate path and inclined in the direction of advance of the conveyor toward this path and forming part of a suction box or plenum which extends the width of the web and the substrate and which is connected to a reduced-pressure generator, i.e. a suction source so that this surface forms a contact surface against which the foil is held by suction.

At the downstream side of this unit there is provided a further plenum chamber, again extending the full width of the substrate and having a gas-permeable surface juxtaposed with this substrate, the latter plenum being connected with an elevated-pressure source so that a gas suction is formed between this surface and the foil to apply the latter to the substrate.

With the system of the present invention, therefore, a high speed application of the foil to the substrate is possible without direct contact between the applying means and the foil so that this web is set against the substrate in a totally smooth and fold-free manner even at the highest speeds of the substrate. The suction box and its gas-permeable surface ensures the maintenance of a certain tension in the foil between the two surfaces and likewise assists in preventing folding or distortion of the foil.

From the foregoing it will be apparent that the smooth application of the foil is a function of the conjoint action of the pressurized plenum and its gas-permeable surface and the suction plenum and its gas-permeable surface, the former providing an air cushion uniformly applying the foil to the substrate while the latter retains the foil in a flat slightly tensioned state preventing the formation of folds and therefore stabilizing the foil before it passes to the air cushion and as it is withdrawn from the supply coil. The supply coil can be provided with an appropriate brake, e.g. a friction brake, so that at most a very slight tension is maintained upon the web, the tension being insufficient to cause stretching or yielding of the web but enough to prevent the coil from overrunning the advance of the web. An important advantage of the system of the present invention is that the supply of gas, hereinafter referred as air, to the air cushion can be terminated periodically or cyclically, thereby interrupting the application of the foil to a substrate or pressing of the foil in the direction of the conveyor in spaces between a succession of boards. Thus with simple interruption of the air feed to the pressurized box or plenum, application of the foil can be interrupted in the spaces between the substrate boards for an intermittent operation of the system. This arrangement is readily controlled.

The suction box can be continuously evacuated with interruption of the feed to the pressurized plenum or can cut off from the suction source intermittently synchroniously with the cut off of the pressurized plenum.

The system of the present invention has been found to be particularly effective for high speed operations since the foil is smoothed by the air cushion onto the surface simultaneously with its application and special smoothing calendars need not be provided.

According to a feature of the invention, a suction box has an underside which is formed as a perforated plate and which, in turn, is covered by a fiber openwork which forms the suction surface and protects the upper surface of the foil web. The openwork can be a felt, mat, nonwoven or woven or knitted fabric.

According to another feature of the invention, the pressurized box forming the air-cushion plenum can also be provided on its underside with a perforated plate forming an air distributor which can also be covered with an openwork, e.g. nonwoven, woven or knitted fabric, to protect the upper surface of the foil in the event of accidental contact.

It has been advantageous, moreover, to provide the suction and pressure box so that they can be individually adjustable vertically, e.g. by providing a head which can be vertically displaced and carries the suction box and the pressure box with at least one of these boxes being mounted for movement on this head. Advantageously, the pressure box is provided with a generally parallelogrammatic linkage to maintain its air-cushion face parallel to the conveyor surface along which the substrate can ride. The suction box can be pivotally mounted on the head independently of the pressure box so that the angle included between its gas-permeable surface and the conveyor can be adjusted or can vary.

According to another feature of the invention, the suction box has a wedge-shaped cross section tapering in the direction of advance of the foil web and the substrate.

According to yet another feature of the invention, the suction and pressure boxes are provided with a single pump or blower whose intake side is connected to the suction box while the discharge side is connected to the pressure box so that this blower serves simultaneously as the suction source and the pressure source and forms with the suction and pressure boxes, an open-air circulating path.

In this system, the flow resistance in the suction box and the compression inherent in the air displacement results in an increased temperature of the air forming the cushion, thereby increasing the bonding effectiveness upon lamination, the higher temperature activating any adhesive which can be applied to the foil web or the substrate. Naturally, other means for heating the gas can be provided in addition or in the alternative and the air path can be provided with valves or the like which can be controlled in response to the movement of the substrates. For very high laminating speeds, the surface of the suction box can be convex as long as the radius of curvature is large by comparison to the width of the foil.

BRIEF DESCRIPTION OF THE DRAWING

The above and other objects, features and advantages of the present invention will become more readily apparent from the following description, reference being made to the accompanying drawings in which.

SPECIFIC DESCRIPTION

Figure 1:
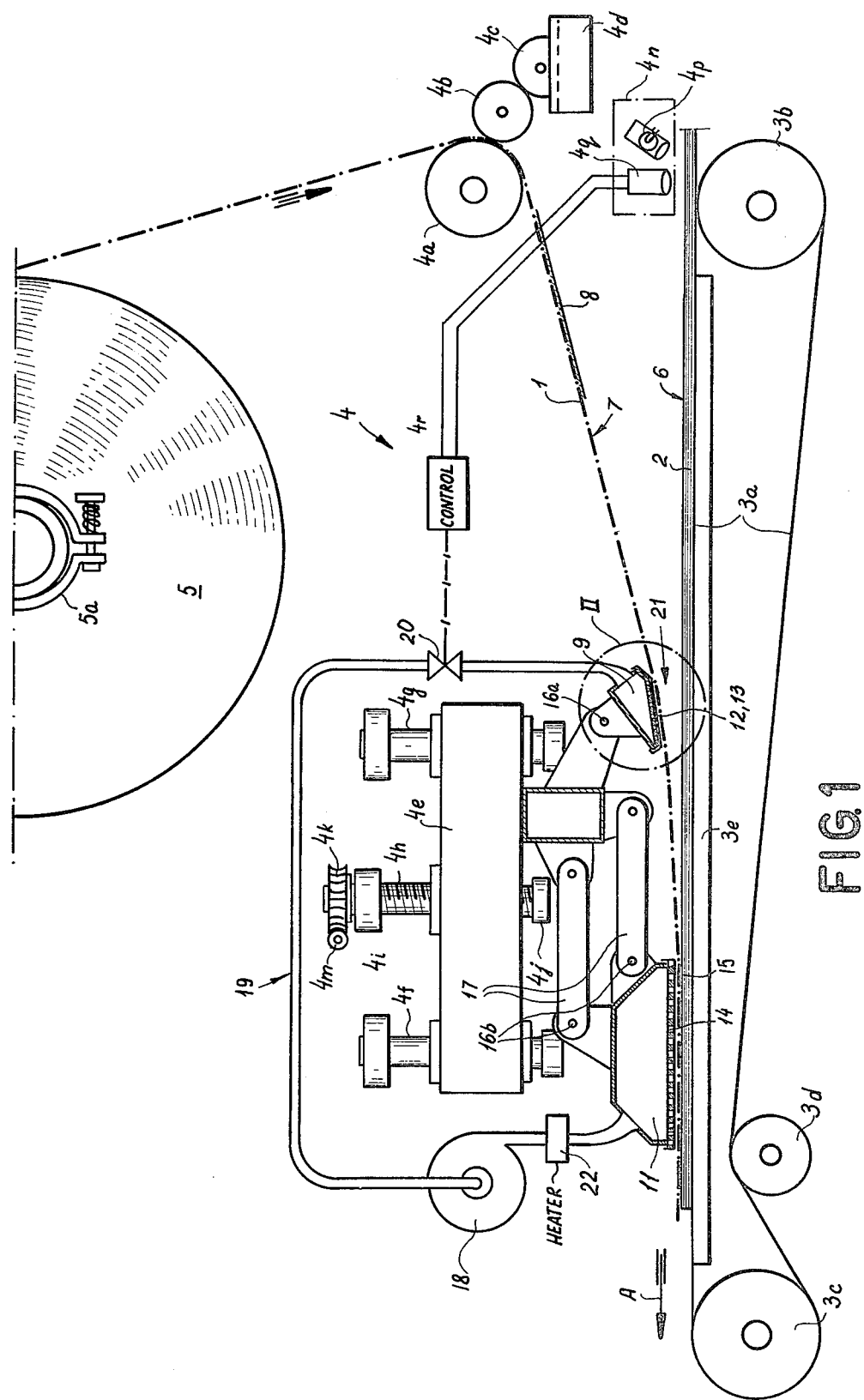
FIG. 1 is a diagrammatical vertical side elevational view, partly broken away, of an apparatus according to the invention.

As has been indicated earlier, the apparatus shown in the drawing can be used for all lamination processes in which a web is to be applied to a substrate displaced past a laminating station, shown in FIG. 1, continuously or intermittently. More specifically, however, the invention is intended for the application of a foil web 1 of synthetic-resin material, paper, resin impregnated paper or a like material forming a protective coating carrying a decorative pattern, to substrates 2 which can be boards or wood or wood-like material such as cellulose fibers. The boards are usually wood laminates themselves (e.g. plywood) and/or low-density or high-density pressed boards such as particle board, chipboard or fiberboard.

The apparatus shown in the drawing is specifically designed for the thermal lamination of the foil web 1 whose underside 7 may be provided with a thermally activatable adhesive or glue 8, to the upper surface 6 of the substrate 2 which is advanced past the laminating station on a conveyor 3. In FIG. 1 this conveyor is shown to comprise an endless belt 3a which passes over rollers 3b and 3c and is held under tension by a roller 3d, the upper pass of the belt being displaced in the direction of the arrow A by a motor (not shown). In the region of the laminating station, the upper pass of the belt rides over a support surface 3e which is intended to hold the substrate against the application of force in the form of an air cushion to apply the foil to the substrate.

The stationary laminating unit 4 which withdraws the foil web from the supply coil 5 comprises a guide roller 4a at which glue can be applied to the underside of the web 7 by any conventional applicator, e.g. a transfer roller 4b resting against a glue pickup roller 4c which dips into the adhesive bath 4b.

The laminating station also comprises a head 4e which is vertically guided on a pair of posts 4f and 4g, this head having a unit which engages a threaded spindle 4h journaled in bearings 4i and 4j, the spindle being driven by a worm gear 4k meshing with a worm 4m. The latter may be manually rotated or motor-driven to raise and lower the head.

The supply coil 5 of the web can be provided with a friction brake 5a to maintain a slight tension on the web as it is withdrawn from the coil, this tension being less than that which is necessary to stretch the foil, but nevertheless being sufficient to keep it taut.

The substrates can be sequentially fed to the conveyor 3 by any conventional means, the leading edge and the trailing edge of each substrate being detected by a photoelectric sensor 4n including a lamp 4p and a photocell 4q. The photocell has a control circuit 4r which can operate a valve 20 to begin or terminate the application of the foil to the substrate in the cadence of passage thereof.

The conveyor 3 can be continuously or intermittently driven.

The laminating head is provided at its upstream or inlet side with a suction box 9 extending the foil of the foil web 1 and spacing of the substrate 2. This suction box 9 is connected to a suction source and has a contact surface 10 which guides the upper surface of the foil 1 and which is formed as a suction surface. The suction box 9 is provided in conjunction with a pressure box 11, which is downstream from the suction box in the direction of the arrow A which represents the direction of advance of the substrates 2 and the web. This pressure box is connected to a source of air under pressure. The pressure box has a gas-permeable surface which forms an air cushion between itself and the web, that presses the web against the substrate.

Figure 2:
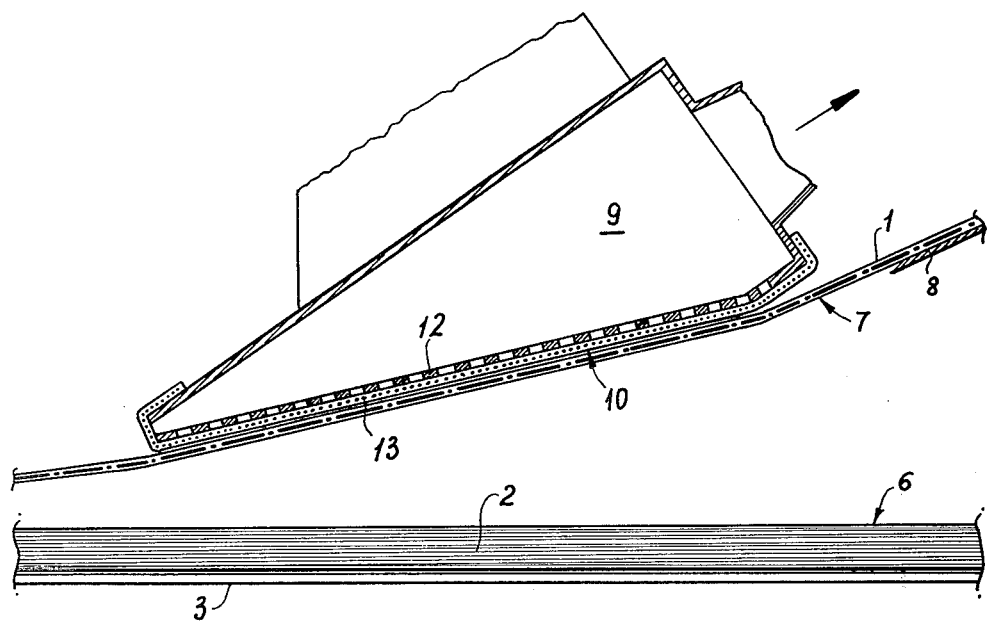
FIG. 2 is a detail view of the region II of FIG. 1.
Figure 3:
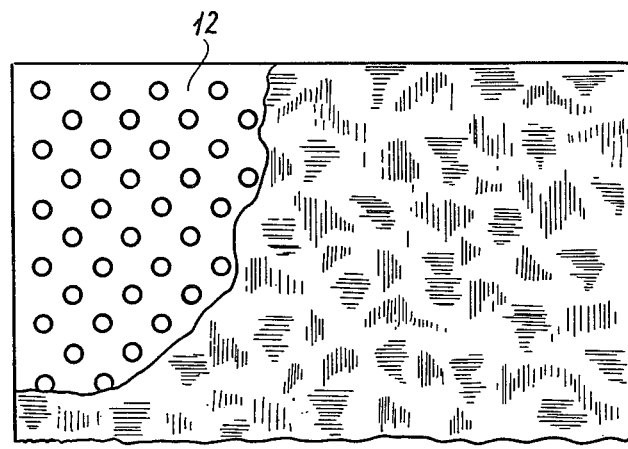
FIG. 3 is a bottom view, partly broken away, of the air-permeable surface of the suction box.

As can be seen from FIGS. 2 and 3, the suction box 9 is formed along its underside with a perforated plate 12 which is covered by a fibrous openwork layer 13, of felt, matted fibers or fabric to form the suction surface. Similarly, the pressure box 11 is formed on its underside with a perforated plate 14 covered by the fibrous layer 15.

The suction box 9, which is wedge-shaped and converges in the direction of travel A, is pivotally mounted at 16a on the head while a parallelogrammatic linkage 17 with pivot 16b swingably mounts the pressure box 11 on this head. Naturally, the adjustment of the pressure and suction boxes can be locked by any conventional means, as desired, to suit particular operating conditions.

The suction box 9 is connected to the intake side of a blower 18 whose discharge side feeds the pressure box 11, so that the single bellow or pump forms both the suction and pressure sources and forms an open air-circulating path which is provided with a heater 22 serving to heat the air of the air cushion in the event the friction heat and compression heat is not sufficient. The circulating path also includes the valve 20, interrupting the air feed to the pressure box and/or the suction at the suction box in the cadence of movement of the substrates, so that the foil is only applied when the boards are passing. The suction box defines a wedge-shaped gap 211 at which the foil is led toward the substrate.

Figure 4:
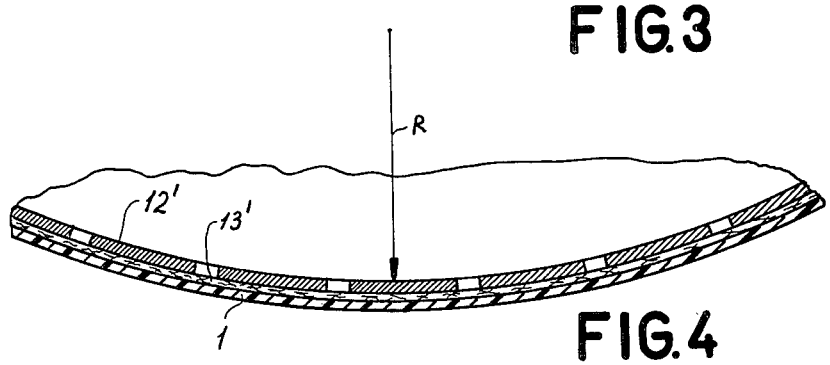
FIG. 4 is a cross section through the air-permeable surface of the suction box taken in a plane perpendicular to the direction of travel of the laminating foil.

In operation, as a substrate moves past the station, the air cushion at box 11 presses the foil, which is held smooth by the suction box 9, against the substrate and uniformly bonds the foil thereto, the air cushion being interrupted by the control 4r and the valve 20 with appropriate timing, when the trailing end of the substrate passes the pressure box 11. The suction and pressure are again applied when the leading edge of the next substrate reaches the pressure box. As can be seen from FIG. 4, the suction surface, 12', 13' formed by the perforated plate and fiber covering, can have a transverse curvature with a radius of curvature R, which is large by comparison with the width of the foil and is convex.

I claim:

1. An apparatus for forming a combination of a web and a substrate, comprising:
    a conveyor for advancing said substrate along a transport path;
    a supply coil of said web spaced from said path;
    a laminating head disposed adjacent said path for drawing said web from said coil and applying said web to said substrate, said head having an upstream side formed with a suction box having a suction surface inducing said web to lie thereagainst, said head further comprising a pressure box downstream from said suction box in the direction of travel of said substrate, said pressure box having a gas-permeable surface juxtaposed with said substrate and forming a gas cushion applying said web to said substrate and enabling said web to bond to said substrate; and
    means for connecting said suction box to a suction source and said pressure box to a pressure source.

2. The apparatus defined in claim 1 wherein said surface of said suction box comprises a perforated plate covered by a fibrous layer.

3. The apparatus defined in claim 1 wherein said surface of said pressure box comprises a perforated plate covered by a layer of fibrous material.

4. The apparatus defined in claim 1 further comprising means for independent adjustment of the positions of said boxes relative to said conveyor.

5. The apparatus defined in claim 1 wherein said surface of said suction box forms a converging gap with said conveyor in said direction of travel.

6. The apparatus defined in claim 1 wherein said suction source is the intake side and said pressure source is the discharge side of a common air-displacement device, forming an open air-circulating path with said boxes.

7. The apparatus defined in claim 6 wherein said air circulation path includes a valve for temporary selective interrupting airflow to and from said pressure box and said suction box, respectively.

8. The apparatus defined in claim 1 wherein said surface of said suction box is convex.

* * * * *